United States Patent
Mori et al.

[19]

[11] Patent Number: 6,138,907
[45] Date of Patent: *Oct. 31, 2000

[54] ELECTRONIC TRANSACTION PROCESSING SYSTEM AND METHOD FOR OPERATING SAME

[75] Inventors: Toru Mori; Makoto Saruya, both of Tokyo, Japan

[73] Assignee: Oki Electric Industry Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,794

[22] Filed: Dec. 1, 1997

[30] Foreign Application Priority Data

Dec. 2, 1996 [JP] Japan ..................... 8-321316

[51] Int. Cl.$^7$ ..................................... G06F 17/60
[52] U.S. Cl. ................ 235/379; 705/39; 902/40
[58] Field of Search ..................... 235/379, 380, 235/383, 375, 449, 492, 493; 902/25, 26, 27, 30, 35, 40; 705/39, 26

[56] References Cited

U.S. PATENT DOCUMENTS

| | | | |
|---|---|---|---|
| 4,197,986 | 4/1980 | Nagata | 235/379 |
| 4,454,414 | 6/1984 | Benton | 235/379 |
| 4,562,340 | 12/1985 | Tateisi et al. | 235/379 |
| 4,736,094 | 4/1988 | Yoshida | 235/379 |
| 4,877,947 | 10/1989 | Mori | 235/381 |
| 5,175,416 | 12/1992 | Mansvelt et al. | 235/379 |
| 5,461,217 | 10/1995 | Claus | 235/380 |
| 5,578,808 | 11/1996 | Taylor | 235/380 |
| 5,644,118 | 7/1997 | Hayashida | 235/379 |
| 5,691,525 | 11/1997 | Aoki et al. | 235/379 |
| 5,793,027 | 8/1998 | Baik | 235/380 |
| 5,812,814 | 9/1998 | Sukegawa | 395/430 |
| 5,854,581 | 12/1998 | Mori et al. | 235/379 |

FOREIGN PATENT DOCUMENTS

| | | |
|---|---|---|
| 0 619 564 | 12/1994 | European Pat. Off. . |
| 0 686 947 | 12/1995 | European Pat. Off. . |
| 7-104891 | 11/1995 | Japan . |
| WO 83/03018 | 9/1983 | WIPO . |
| WO 96/36947 | 11/1996 | WIPO . |

*Primary Examiner*—Donald Hajec
*Assistant Examiner*—Diane I. Lee
*Attorney, Agent, or Firm*—Venable; Robert J. Frank; Jeffrey W. Gluck

[57] ABSTRACT

An electronic transaction processing system performing a deposit and/or a withdrawal of digital cash between a customer and a banking facility includes a customer money card storing digital cash of the customer, a bank money card storing digital cash of the banking facility and an escrow card storing transaction information with respect to a transaction with digital cash between the customer and the banking facility. A transaction is processed by renewing digital cash stored in the customer money card and in the bank money card in response to the amount of the transaction, and transaction processing is performed after storing each balance information of digital cash stored in the customer money card and in the bank money card and the amount of the transaction in the escrow card.

17 Claims, 19 Drawing Sheets

< DIGITAL CASH PAYMENT >

ACCOUNT NUMBER No.030-0402425
×× BANK Mr/Ms○○    SABURO
BALANCE              $1377.50

CARD NUMBER    No.030-1234567
×× BANK Mr/Ms○○    HITOMI
BALANCE              $100.00

TRANSACTION AMOUNT $ ○○,○○○

TRANSACTION LIMIT AMOUNT
$750.00

| 7 | 8 | 9 |
| 4 | 5 | 6 |
| 1 | 2 | 3 |
| 0 | 000 | $ |

CANCELLATION/AMENDMENT

CONFIRMATION

Fig.10

< DIGITAL CASH DEPOSIT >

ACCOUNT NUMBER  No.030-0402425
XX BANK Mr/MsOO    SABURO
BALANCE           $1377.50

CARD NUMBER     No.030-1234567
XX BANK Mr/MsOO    HITOMI
BALANCE           $100.00

TRANSACTION AMOUNT $ ◯◯,◯◯◯

TRANSACTION LIMIT AMOUNT
         $100.00

| 7 | 8 | 9 |
| 4 | 5 | 6 |
| 1 | 2 | 3 |
| 0 | 000 | $ |

CANCELLATION/AMENDMENT

CONFIRMATION

| 43 | CARD NUMBER |
| | OPERATION APPARATUS NUMBER |
| | PASSWORD |
| | TRANSACTION DAY/TIME INFORMATION |

| 44a | OPERATION NUMBER |
| | ACCOUNT NUMBER |
| | CUSTOMER FULL NAME |
| | TRANSACTION DAY/TIME INFORMATION |
| | TRANSACTION AMOUNT INFORMATION |

| 44b | OPERATION NUMBER |
| | ACCOUNT NUMBER |
| | CUSTOMER FULL NAME |
| | TRANSACTION DAY/TIME INFORMATION |
| | TRANSACTION AMOUNT INFORMATION |

| OPERATION NUMBER |
| * |

ELECTRONIC TRANSACTION PROCESSING SYSTEM AND METHOD FOR OPERATING SAME

BACKGROUND OF THE INVENTION

This invention relates to an electronic transaction system employing microchip cards which receive, electronically store and transfer therebetween digitized information relating to the monetary value of financial transactions.

An electronic transaction processing system using a prepaid microchip card is disclosed in U.S. Pat. No. 4,877,947. The patented system employs a customer's microchip card in which the customer's monetary value is digitally stored and a vendor's microchip card in which the vendor's monetary value is digitally stored. When a purchase is made, the customer inserts his card in a customer's microchip card reader/writer and enters a password on an attached keypad. The vendor enters the amount of the purchase on a keypad connected to a vendor's microchip card reader/writer in which the vendor's card has been inserted. The amount of the purchase is communicated from the vendor's microchip card reader/writer to the customer's microchip card reader/writer, and then from the two microchip card reader/writers to both microchip cards. With suitable verifications, the amount of the purchase is deducted from the balance recorded in the customer's microchip card and added to the balance recorded in the vendor's microchip card.

An electronic transaction system transferring a monetary value between an automated teller machine and a customer's microchip card is disclosed in PCT International Publication Number WO95/24690. In this system, the automated teller machine includes an ATM card in its housing in which a bank's monetary value is stored. A monetary value is transferred from or to the customer's microchip card via the ATM card. In case of withdrawal, the customer's microchip card is inserted by the customer in the automated teller machine, and the monetary value corresponding to the transaction amount he or she wishes to withdraw is transferred from the ATM card to the customer's microchip card. As a result, the monetary value in the customer's microchip card is increased, and the monetary value in the ATM card is decreased. In the case of a deposit, the monetary value is transferred from the customer's microchip card to the ATM card.

The electronic transaction system has many advantages over a cash payment system. However, to increase its popularity, the system must be secure against loss of monetary value, especially loss caused by a malfunction of the system when the monetary value is transferred.

SUMMARY OF THE INVENTION

Accordingly, it is an object of the invention to provide a secure electronic transaction system suitable for carrying out financial transactions.

It is another object of the present invention to provide an electronic transaction system which includes a supplemental record maintained at a secure location which can be searched in the event incorrect digital information has been inadvertently stored on a microchip card.

In accordance with the present invention, an electronic transaction processing system for performing a deposit and/or a withdrawal with digital cash between a customer and a banking facility comprises a first memory apparatus owned by the customer for storing digital cash of the customer, a second memory apparatus owned by the banking facility for storing digital cash of the banking facility and a third memory apparatus for storing transaction information with respect to a deposit transaction or a withdrawal transaction with digital cash between the customer and the banking facility. A transaction is processed by renewing digital cash stored in the first memory apparatus and in the second memory apparatus in response to the amount of the transaction, and the transaction processing is performed after storing each balance information of digital cash stored in the first memory apparatus and in the second memory apparatus, and the amount of the transaction in the third memory apparatus.

BRIEF DESCRIPTION OF THE DRAWINGS

The present invention is illustrated by the following drawings in which:

FIG. 10 shows a first typical display on the customer operation panel included in the automatic teller machine of FIG. 2;

FIG. 13 shows a second typical display on the customer operation panel included in the automatic teller machine of FIG. 2;

FIG. 19 shows a data format of an escrow card used in the automatic teller machine of FIG. 18.

DETAILED DESCRIPTION OF THE PREFERRED EMBODIMENTS

Figure 2:
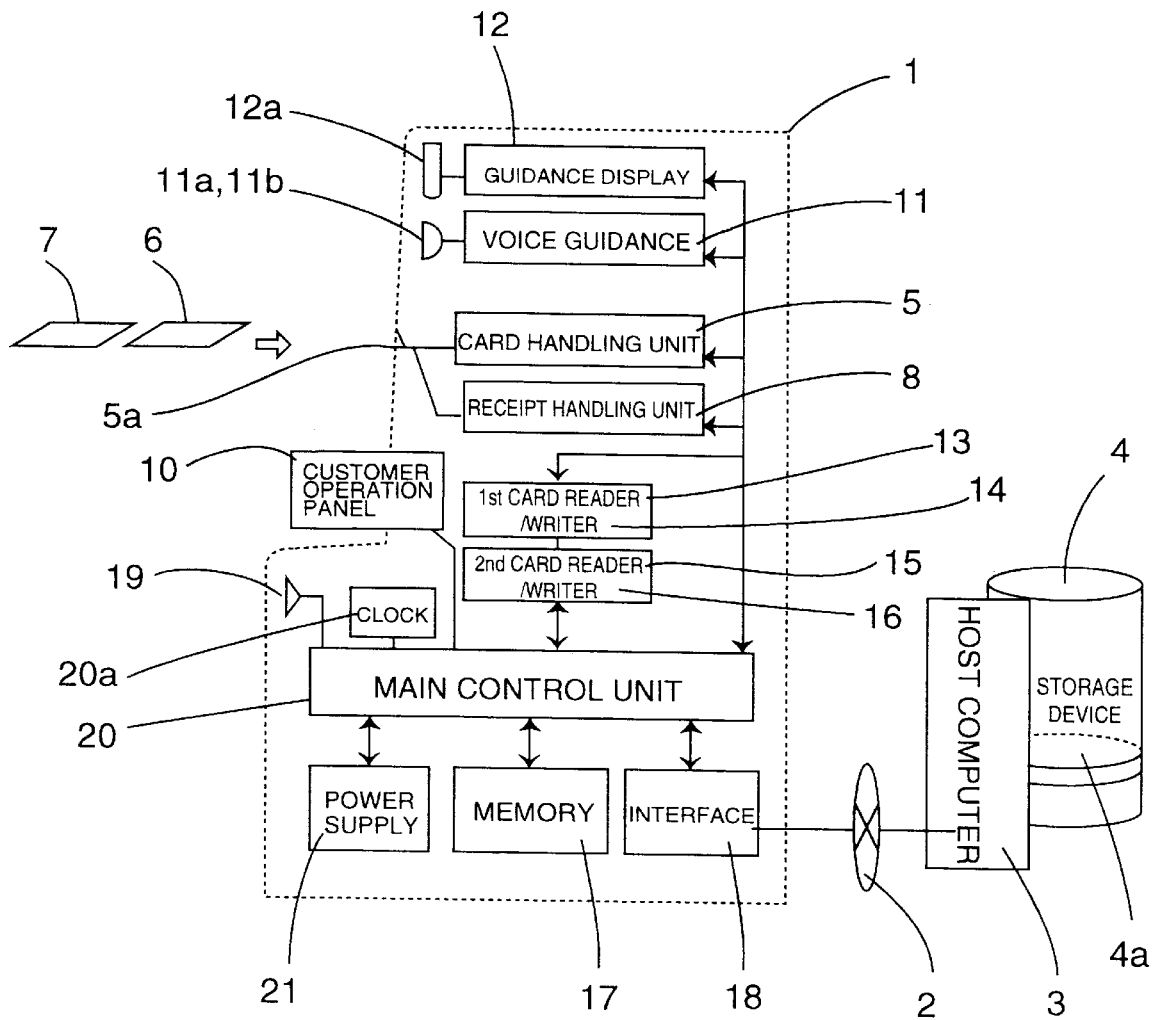
FIG. 2 is a block diagram of an automatic teller machine according to a first embodiment of the present invention.

Referring to FIG. 2, there is shown an automatic teller machine 1 associated with and in communication with a specific bank. The teller machine 1 is installed at a location accessible to the public such as a department store, convenience store, gas station or the bank's own facility. The teller machine 1 is connected by a communication line 2 to a host computer 3 which controls a storage device 4 having a deposit ledger file 4a.

The deposit ledger file 4a stores the addresses, names, ages, occupations, account numbers, passwords and balance data of each of the bank's customers. The balance data is renewed by the host computer 3 whenever a transaction is carried out, and therefore the deposit ledger file 4a always stores the latest balance information of each customer.

A card handling unit 5 writes and reads information stored in a customer identification card 6 or a customer money card (a first memory apparatus) 7. A card insertion/return opening 5a is provided at the front of the automatic teller machine 1 for accepting and discharging cards 6 and 7.

Figure 3:
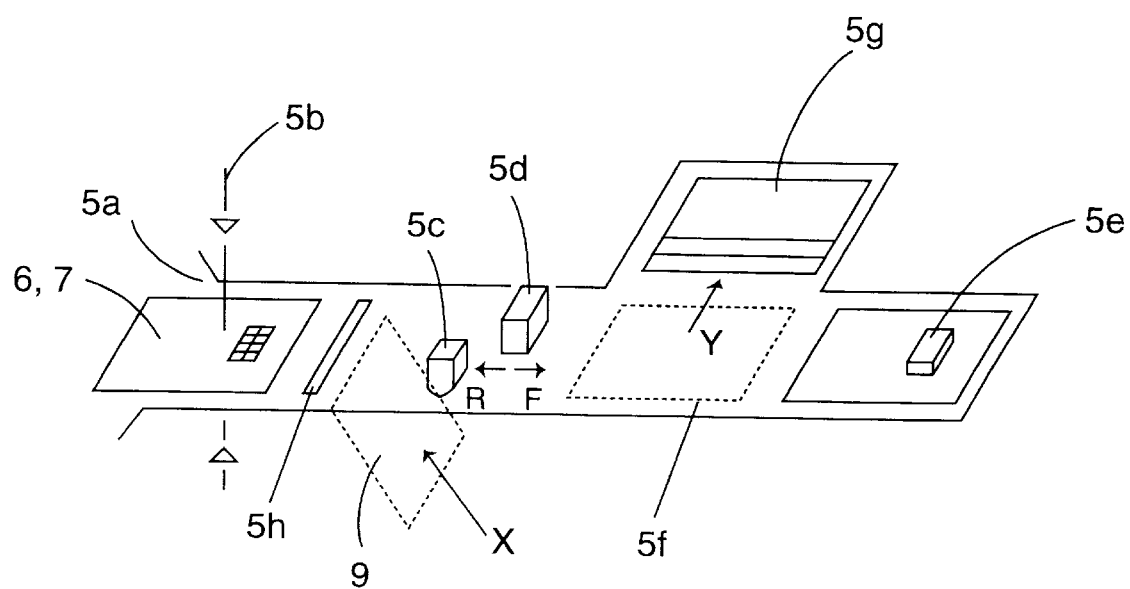
FIG. 3 is a block schematic diagram of a card handling unit included in the automatic teller machine of FIG. 2.

The card handling unit 5 is shown in FIG. 3 wherein a detection device 5b, consisting of a light-emitting element and a light-receiving element, detects the presence of a customer identification card 6 or a customer money card 7 when the card is interposed between the light-emitting and receiving elements, thereby cutting off a light beam transmitted between the elements. A magnetic information reader 5c reads information written on the magnetic stripe of the card, and an embossed character reader 5d reads optically convex characters provided on the card. A microchip card reader/writer 5e connects to the card physically and electrically, and transmits information to and receives information from the card. A card holding position 5f is provided between the embossed character reader 5d and the microchip card reader/writer 5e, and a card refuge location 5g holds the card that has been conveyed in the direction of the arrow Y from the card holding position 5f.

An opening 5h is provided in the card conveyance path for issuance of a receipt 9 in the direction of the arrow X. The receipt is printed by a receipt handling unit 8 (FIG. 2). The receipt handling unit 8 prints the contents of each transaction and issues the receipt 9 to the customer through the opening 5h.

A customer operation panel 10 (FIG. 2) comprises a touch screen for displaying characters and pictures that represent transaction operation such as "withdrawal" and "deposit" to the customer. The customer selects the desired transaction item from the panel 10. A voice guidance unit 11, comprising a speaker 11a and a microphone 11b, is provided at the front of the automatic teller machine to present operating information in the form of speech to the customer. Also, a guidance display 12 displays transaction items on a flat-panel display 12a.

A first card reader/writer 13 is connected physically and electrically to a bank money card 14 (a second memory apparatus) and transmits information to the bank money card 14 by associated control software. A second card reader/writer 15 connects physically and electrically to an escrow card 16 (a third memory apparatus) and transmits information to the escrow card 16 by associated control software.

A memory 17 is provided which comprises a flexible disk for storing transaction histories, a read only memory and a random access memory that stores the control program of the automatic teller machine 1. An approach detection device 19, which employs ultrasound, detects that a customer has approached the automatic teller machine 1. Upon detecting the approach of a customer, the automatic teller-machine 1 switches from a waiting condition to an active condition.

A main control unit 20, which is connected by an interface 18 to the host computer 3, controls every component mentioned above and has a clock 20a that provides time information. A power supply 21 supplies electric power to each of the components comprising the automatic teller machine. The memory 17 and clock 20a are actuated by a battery (not shown) to assure that information stored in the memory is retained and that operation of the clock is not stopped even if the power supply 21 is shut down.

Figure 4:
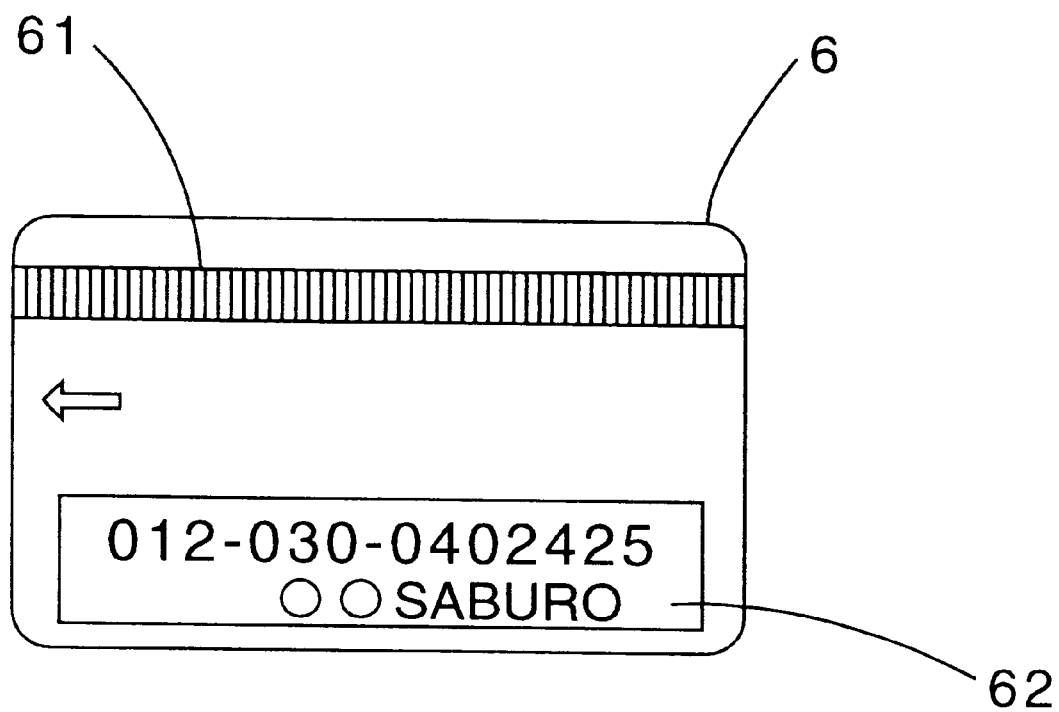
FIG. 4 is a schematic illustration of a customer identification card used in the present invention.

The customer card 6 (FIG. 4) contains identification information, such as the full name and account number of the customer which is recorded magnetically in a magnetic stripe 61. Also, bank card information, such as the location of the automatic teller machine 1 and the customer's full name are provided in an embossed character area 62 using convex characters. The customer identification card 6 is not used with the first embodiment of the invention but is used with a second embodiment of the invention to be described hereinafter.

The customer money card 7 is a card that contains an integrated circuit and complies with international standards of size, physical and electrical characteristics, and communication protocol. The customer money card 7 can be compared to "a purse" of digital cash owned by the customer. The integrated circuit electronically and digitally stores a monetary value which corresponds to the value of the card. The digital cash balance is renewed for every transaction.

The bank money card 14 is also a card containing an integrated circuit and complies with international standards. The bank money card 14 can be thought of as a "safe" containing digital cash which is housed in the automatic teller machine 1. The integrated circuit electronically and digitally stores a monetary value which corresponds to the value of the card, and the digital cash balance is renewed for every transaction.

The escrow card 16 contains an integrated circuit which stores temporary transaction information sent to and received from the customer money card 7 and the bank money card 14. The escrow card 16 stores transactions data temporarily, until an electronic transaction between the customer money card 7 and the bank money card 14 has been completed. The escrow card will be described in connection with FIGS. 5(a) and 5(b).

Figure 5A:
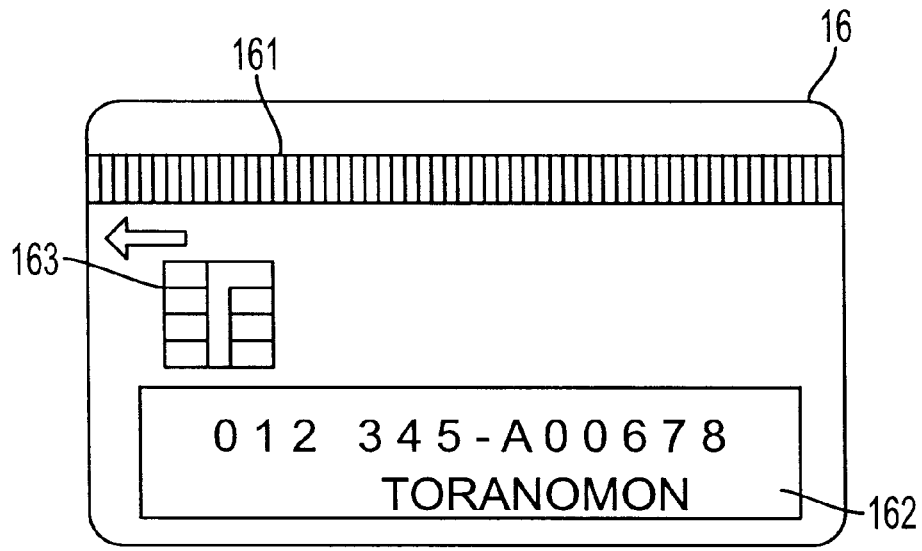
FIGS. 5a and 5b are schematic illustrations of an escrow card used in the present invention.

Referring to FIG. 5(a), the escrow card 16 is provided with a magnetic stripe 161 for magnetically recording data such as is provided on a bank card, a number identifying the business at which the teller machine 1 is located, and a discrimination number. In addition, the magnetic stripe 161 records a discrimination code which indicates that an integrated circuit 163 is built into the escrow card 16. In this way, it can be determined that the integrated circuit 163 is built into the escrow card 16 even if only a simple magnetic information reader is available and without accessing the integrated circuit.

An embossed character area 162, using convex characters, is provided to identify the bank card number, the number of the business location at which the teller machine is located, a discrimination code, and the name of the business at which the teller machine is located. For example, in FIG. 5(a), the bank card number is "012", the business number is "345", the discrimination number is "A00678", and the name of the business is "TORANOMON". These convex characters are read by the embossed character reader 5d described in connection with FIG. 3.

Figure 5B:
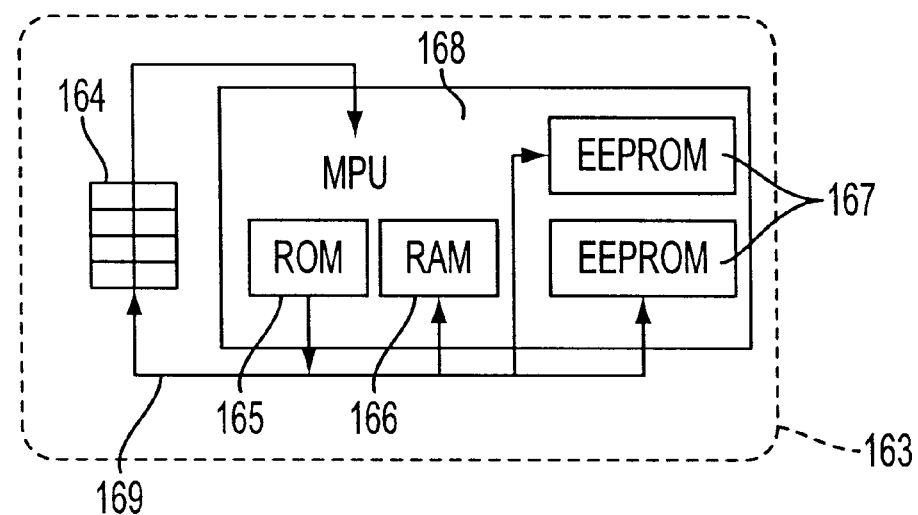

Referring to FIG. 5(b), the integrated circuit 163 is provided in the escrow card 16 at a selected location within the card. A terminal 164 attached to the integrated circuit 163 and exposed on the surface of the card is connected to the second card reader/writer 15. The integrated circuit 163 has a read only memory (ROM) 165 and a random access memory (RAM) 166. The ROM 165 stores various processing programs that include control software, for example communication control and command processing, and the RAM 166 temporarily stores a control program and transaction data. EEPROMs 167 are nonvolatile memories that write and also erase storage information and accumulate transaction data. A micro-processor 168 controls each memory and computes balance and transaction amounts. FIG. 5(b) shows terminal 164, ROM 165, RAM 166, EEPROMs 167, micro-processor 168 and a data bus 169. However, it will be understood that these components are buried in the card as an integrated circuit and are not formed on the magnetic stripe 161 or the embossed character area 162.

The data stored within the escrow card 16 will now be described with reference to FIG. 6 which divides the data into three parts—a discrimination information part 22, a customer information part 23 and a spare storage part 24. The discrimination information 22 consists of a card number, an operation apparatus number, a password, transaction day/time information 22a and digital cash balance information 22b. The card number is a number peculiar to the escrow card 16 and the operation apparatus number is the control number of the automatic teller machine 1 in which the escrow card 16 is installed. The password is the number which must be inputted to read out transaction information on the occasion of an apparatus fault. The transaction day/time information 22a stores the time when an electronic transaction starts, and the digital cash balance information 22b stores the digital cash balance information read from the bank money card 14. The customer information 23 is stored information read out from the customer money card, and consists of a bank code, a business store number, an account number, the customer's full name, the digital cash customer balance information 23a and the transaction amount information. The digital cash customer balance information 23a stores the customer's balance at the starting point of a transaction and the transaction amount information 23b stores the amount of the transaction input by the customer. The spare storage portion 24 is used when the customer information 23 is stored for a regular period or when a customer trades with a plurality of customer money cards.

Figure 6:
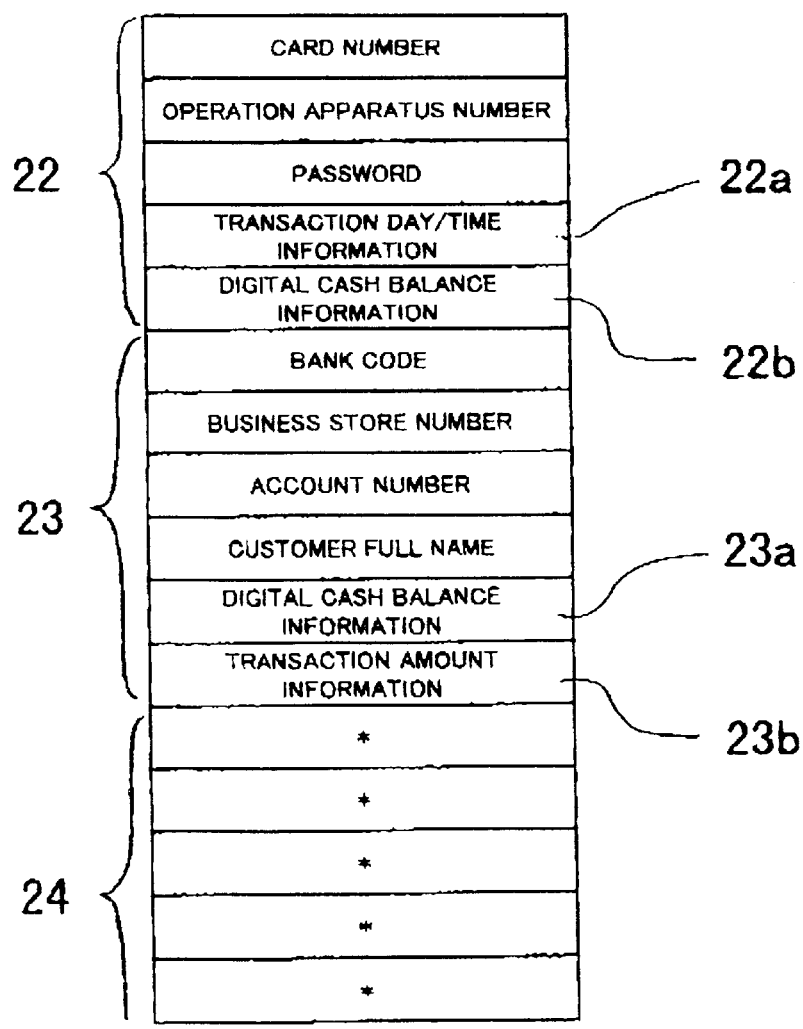
FIG. 6 shows a data format of the escrow card of FIGS. 5a and 5b.

The customer money card 7 is also shown by FIGS. 5(a) and 5(b) except that the name of the business at which the teller machine 1 is located is omitted and the information thereon includes at least that identified by the number 23 in FIG. 6. The bank money card 14 is shown by FIGS. 5(a) and 5(b) and the information thereon includes at least a bank code, a password, a number corresponding to the location of the teller machine and digital cash balance information.

Figure 1:
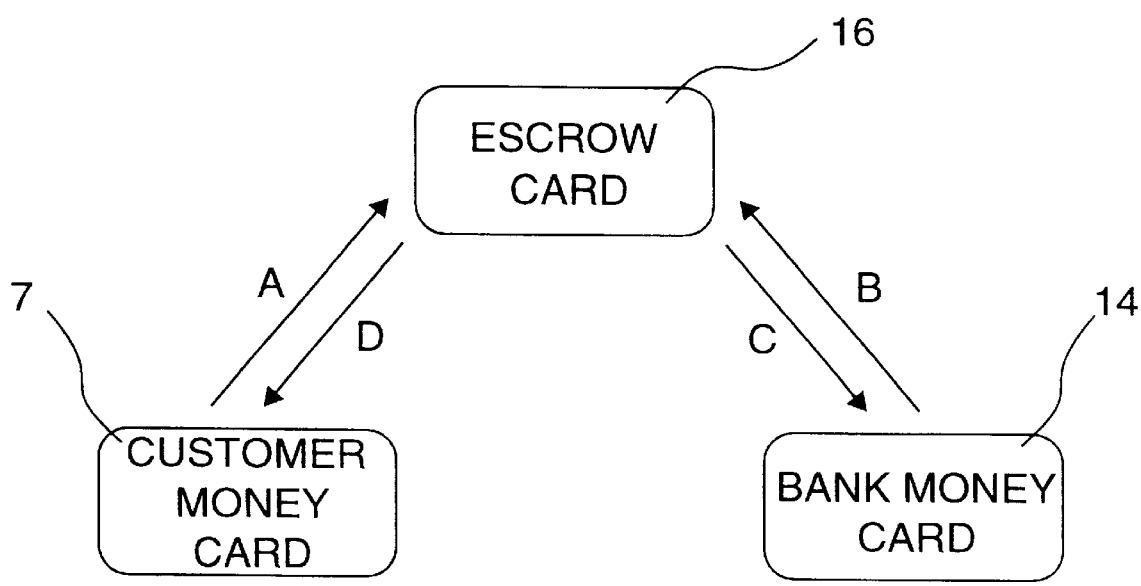
FIG. 1 is a diagrammatic illustration of electronic transactions using microchip cards for carrying out several embodiments of the present invention.

Referring to FIG. 1, the following is an outline of the operation of the electronic transaction system of the present invention. In an initial step, the information stored in the customer's money card 7 is transferred to the escrow card 16 as indicated by arrow A. This information includes the amount of the desired transaction input by the customer and the digital cash balance information stored in the customer's money card 7. Next, the information stored in the bank money card 14 is stored in the escrow card 16 as shown by arrow B. This information includes the digital cash balance information stored in the bank money card 14.

Each of the digital cash balances stored in the bank money card 14 and the customer money card 7 are renewed when the information from the customer's money card 7 and the bank money card 14 are stored in the escrow card 16 as shown by arrows C and D. That is, before the digital cash balances stored in the customer money card 7 and the bank money card 14 are renewed, the digital cash balance information stored in the customer money card 7, in the bank money card 14 before renewal and also the transaction amount are stored in the escrow card 16.

Details of various transactions for which the electronic transaction processing system of this invention may be used will now be described.

Digital Cash Withdrawal Processing

Figure 7:
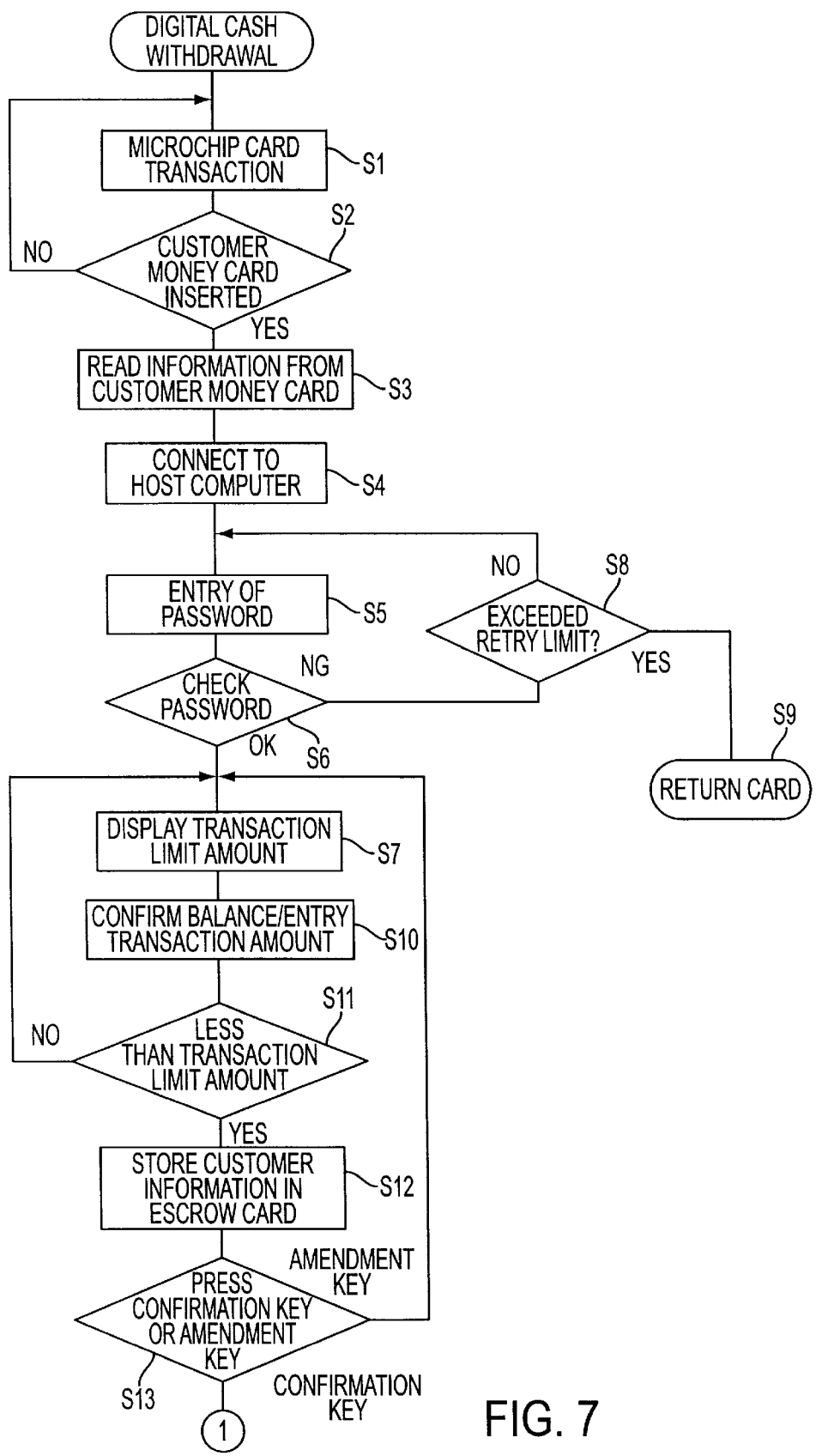
FIGS. 7 and 8 are flow charts showing electronic transactions carried out with the present invention.
Figure 8:
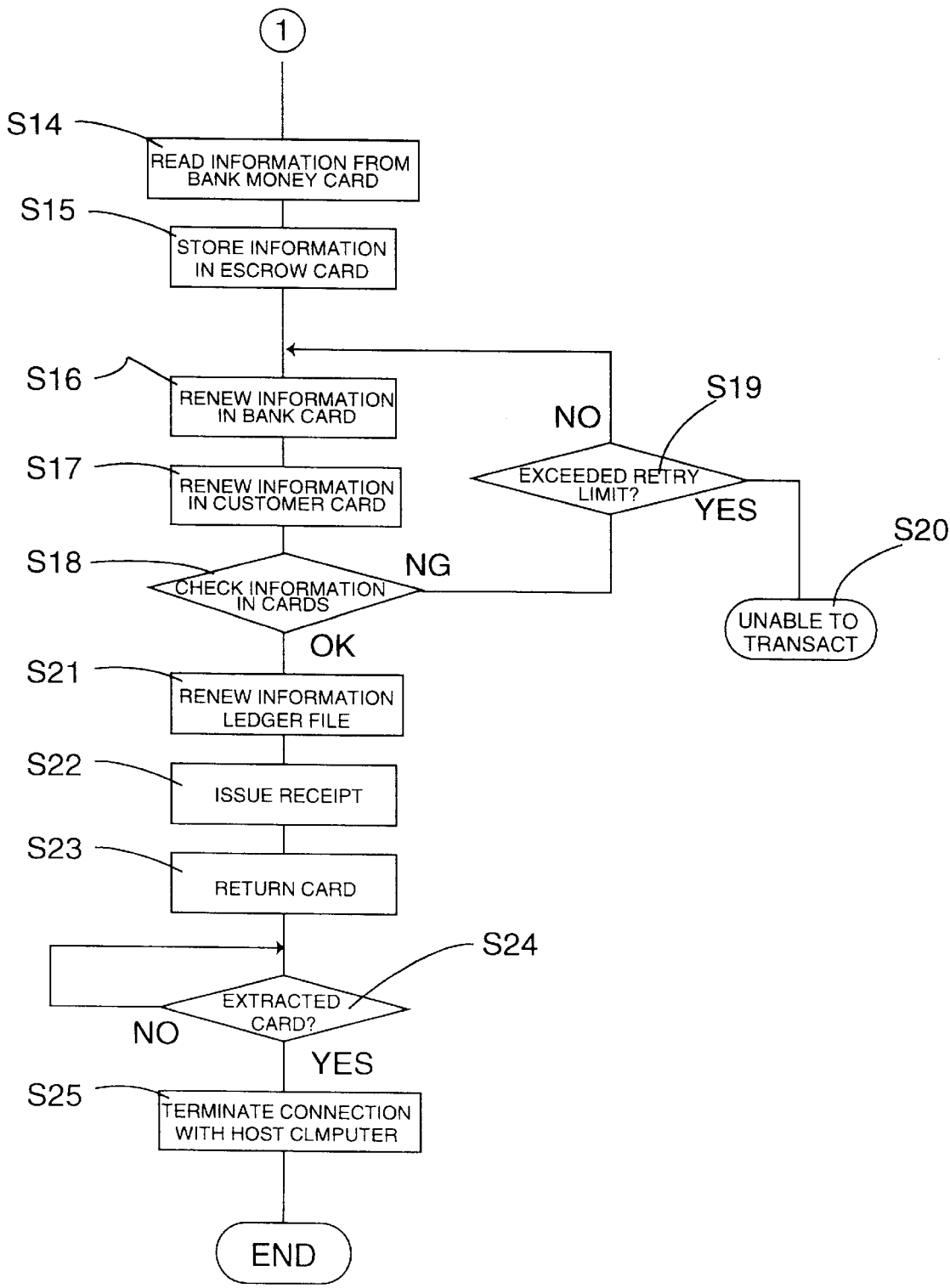
Figure 9:
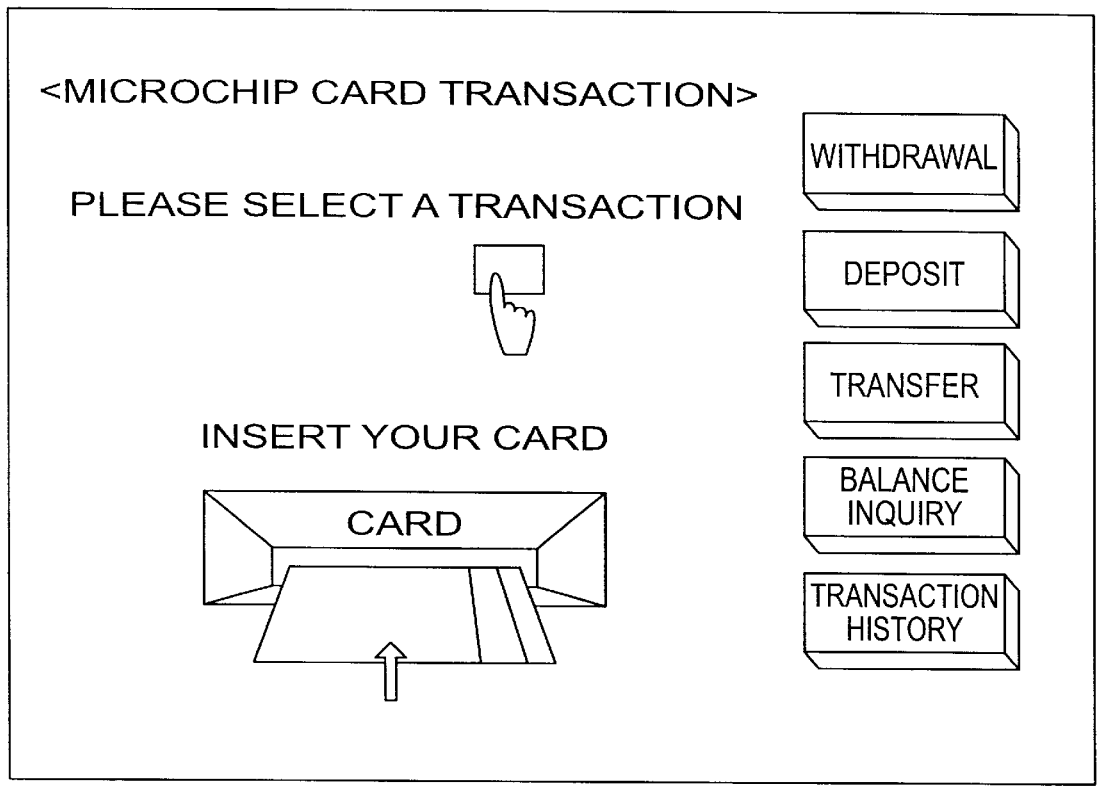
FIG. 9 shows the customer operation panel included in the automatic teller machine of FIG. 2.

Referring to the flow charts of FIGS. 7 and 8 and to FIGS. 9 and 10 which illustrate a typical customer operation panel 10, the steps of a transaction in which a customer's microchip card is used to withdraw some digital cash from the bank are explained.

When a customer approaches the automatic teller machine 1, the approach detection device 19 detects the presence of the customer. In response, the automatic teller machine 1 changes the display of a touch screen on the customer operation panel 10 from a waiting screen to a screen which requests the customer to input information describing the transaction the customer desires to perform. When the customer inputs "electronic transaction" on the touch screen, the screen changes to the screen shown in FIG. 9 (step S1 of FIG. 7) showing that an electronic transaction has been selected. The message 'insert your card' is displayed on the screen in a flickering mode, and the customer inserts the money card 7 in the card insertion/return opening 5a (Step S2), following which the magnetic information reader 5c reads the magnetic information stored in the magnetic stripe 161 on the customer money card 7. If it is determined that the card 7 is valid based on the magnetic information stored on stripe 161, the embossed character reader 5d reads the embossed character area 162 on the customer money card 7, and the information stored on stripe 161 and in area 162 is stored in memory 17. Next, the card handling unit 5 conveys the customer money card 7 to the microchip card reader/writer 5e and reads the customer information stored in the integrated circuit 163 (Step S3). When the customer information is read normally from the customer money card 7, it is transmitted to the host computer 3 which retrieves the customer's information from the deposit ledger file 4a inside the storage device 4 (Step S4).

To make certain the person inserting the customer money card is the actual owner thereof, the statement "Input your password" is displayed on the customer operation panel 10 of the automatic teller machine 1. The customer then inputs the password assigned to him by the bank (Step S5), and the password is checked (Step S6) to confirm that the holder of the card is entitled to use it. If confirmation is obtained, the host computer 3 accesses the deposit ledger file 4a of the storage device 4, reads out the bank balance information of the customer and transmit this information to the automatic teller machine 1.

When the automatic teller machine 1 receives this balance information, the screen shown in FIG. 10 is displayed on the customer operation panel 10 (Step S7). For example, in FIG. 10, the balance in a customer's account is displayed on the screen as $1377.50, and the digital cash balance of the customer money card 7 is displayed on the lower part of the screen as $100.00. A transaction limit amount in digital cash is displayed as $750.00, because, in this example, the customer money card 7 has an accumulation limit amount of digital cash of $850.00. That is, the total of the digital cash balance on the customer money card 7 and the amount of the transaction can not exceed $850.00. Therefore, in this example, the transaction limit amount becomes $750.00 because the digital cash balance of $100.00 is subtracted from the accumulation limit amount of $850.00 (Step S7).

If the customer inputs an incorrect password in step S5, the message "Invalid Password. Please Input Your Password Again" appears on the customer operation panel 10. If the password input by the customer does not agree even if this operation is repeated several times, the message "Invalid Password. Transaction Can Not Be Completed" appears on the customer operation panel 10 (Step S8). The card handling unit 5 then terminates the physical and electrical connections with the integrated circuit 163 and discharges the customer money card 7 from the card insertion/return opening 5a.

Assuming that a valid password has been inputted, the customer confirms that the display is correct in step S7 and inputs the transaction amount (Step S10). The main control unit 20 then adds the transaction amount to the digital cash balance in the customer money card 7, and the main control unit 20 determines whether the result of this addition is less than the accumulation limit amount (Step S11). If the sum of the transaction amount and the digital cash balance is less than the accumulation limit amount, the escrow card 16 stores the customer information 23 including the transaction amount information 23b shown in FIG. 6 (Step S12).

When the sum of the transaction amount and the digital cash balance is larger than the accumulation limit amount in step S11, the transaction limit amount "$750.00" on the screen is blinked to notify the customer that the requested transaction exceeds the limit.

After storing the customer information 23 (FIG. 6) in the escrow card 16 in step S12, the stored transaction amount information 23b is read out from the escrow card 16 and is displayed on the customer operation panel 10. The customer confirms this display by pressing the 'Confirmation' key (Step S13). On the other hand, if there is an error in the transaction amount, the customer presses the 'cancellation/amendment' key. In the latter case, an amendment input screen is displayed on the customer operation panel 10, and the operation is returned to the step of the flow chart of FIG. 7 just prior to step S7.

The digital cash balance information 22b is read from the bank money card 14 (Step S14). The escrow card 16 stores this digital cash balance information 22b and the transaction day/time information 22a (Step S15). Next, the stored digital cash balance information in the escrow card 16 and the digital cash balance information in the bank money card 14 are compared. If the amounts are the same, the transaction amount is deducted from the digital cash balance of the bank money card 14 and the digital cash balance information of the bank money card 14 is renewed (Step S16). Further, the transaction amount is added to the digital cash balance of the customer money card 7 and the digital cash balance information of the customer money card 7 is renewed (Step S17).

Next, the transmission of fund information as renewed electronic data is confirmed. First, the transaction amount is added to the new digital cash balance inside the bank money card 14, and card 14 is checked to determine whether the result and the digital cash balance information 22b stored in the escrow card 16 are equal. Second, the transaction amount is deducted from the new digital cash balance in the customer money card 7, and the result is checked to determine whether the result and the digital cash customer balance information 23a in the escrow card 16 are equal (Step S18).

If the result of this check is disagreement, steps S16, S17 and S18 are repeated (Step S19). The transaction is interrupted in the case of disagreement, even if this operation is repeated several times (Step S20). If the result of the check is agreement in step S18, the transaction information is transmitted to the host computer 3 and the deposit ledger file 4a of the customer is renewed (Step S21).

The receipt handling unit 8 prints the customer's full name, account number, the transaction amount, new digital cash balance information and embossed character information on the receipt 9 and conveys the receipt to the opening 5h (Step S22).

The customer money card 7 is removed from its physical and electrical connection with the microchip card reader/writer 5e and is removed with the receipt 9 from the card insertion/return opening 5a (Step S23). When the customer extracts the money card 7 from the card insertion/return opening 5a, the detection device 5b detects the extraction (Step S24). In response to detection of the card extraction by the detection device 5b, the automatic teller machine 1 terminates the connection with the host computer 3 and completes the transaction (Step S25).

Transaction data is left on the escrow card 16 in this embodiment. Therefore, new transaction data is written over the old transaction data in step S12 and S15. However, the transaction data can be erased after the transaction has been completed. Further, when the customer uses the customer identification card 6, the transaction account of the customer is selected from the magnetic information in the customer identification card.

Digital Cash Deposit Processing

Figure 11:
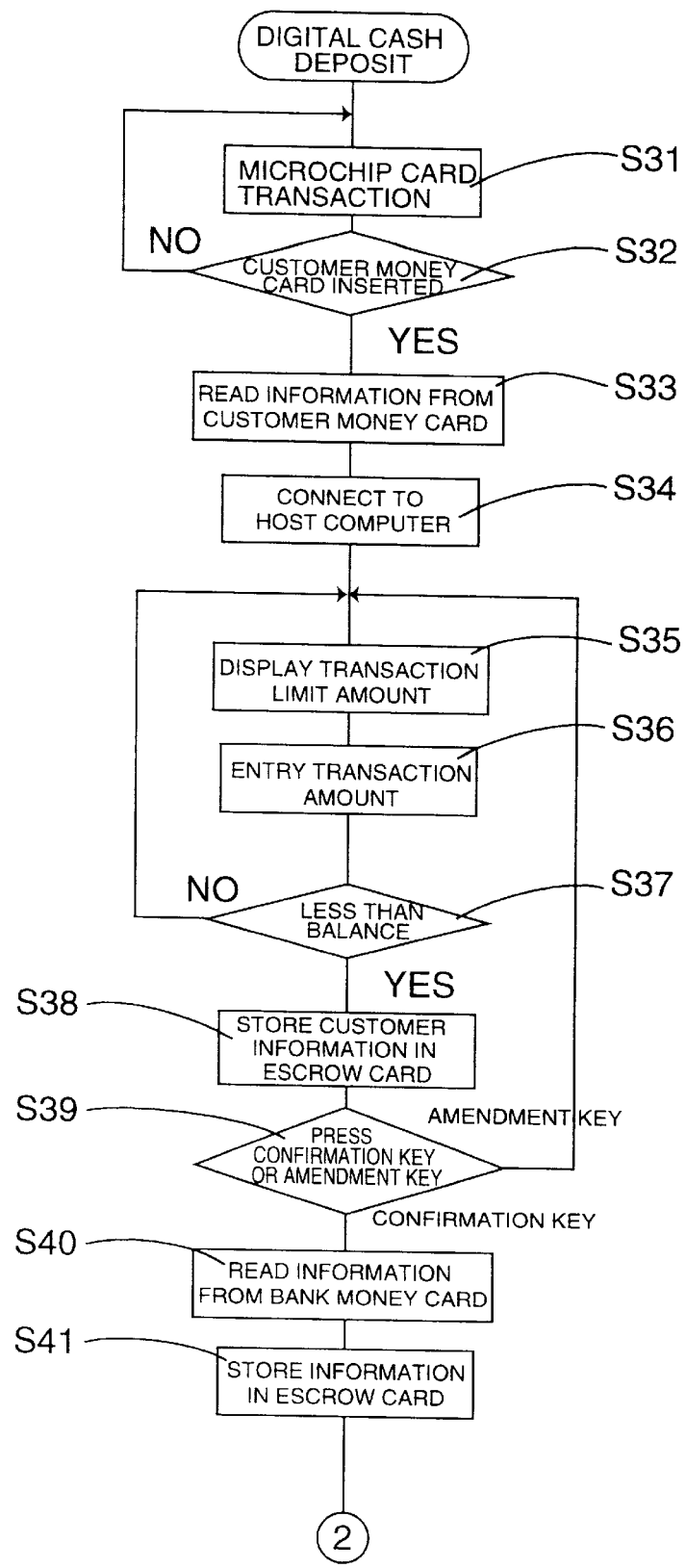
FIGS. 11 and 12 are flow charts showing other electronic transactions carried out with the present invention.
Figure 12:
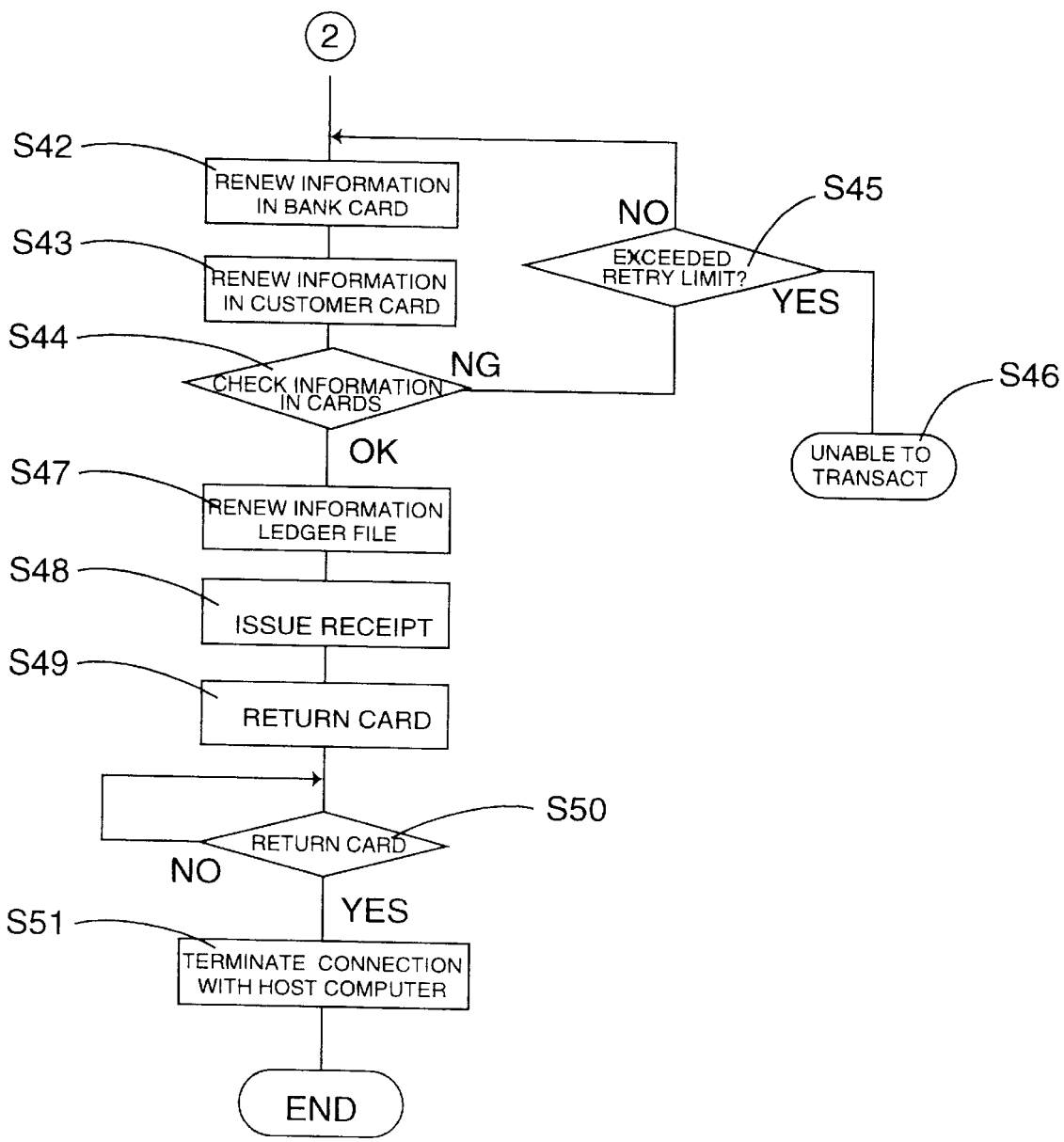

Referring to the flow charts of FIGS. 11 and 12, the steps of a transaction in which a customer's microchip card is used to deposit digital cash in the bank are explained.

When a customer approaches the automatic teller machine 1, the approach detection device 19 detects the presence of the customer. In response, the automatic teller machine 1 changes the display of a touch screen on the customer operation panel 10 from a waiting screen to a screen which requests the customer to input information describing the transaction the customer desires to perform. When the customer inputs 'electronic transaction' on the touch screen, the screen changes to the screen shown in FIG. 9 (step S31 of FIG. 11) showing that a microchip card transaction has been selected.

The message 'insert your card' is displayed on the screen in a flickering mode, and the customer inserts the money card 7 in the card insertion/return opening 5a (Step S32) following which the magnetic information reader 5c reads the magnetic information stored in the magnetic stripe 161 on the customer money card 7. If it is determined that the card 7 is valid based on the magnetic information stored on stripe 161, the embossed character reader 5d reads the embossed character area 162 on the customer money card 7, and the information stored on stripe 161 and in area 162 is stored in memory 17. Next, the card handling unit 5 conveys the customer money card 7 to the microchip card reader/writer 5e and reads the customer information stored in the integrated circuit 163 (Step S33).

When the customer information is read normally from the customer money card 7, it is transmitted to the host computer 3 which retrieves the customer's information from the deposit ledger file 4a inside the storage device 4 (Step S34). The host computer 3 accesses the deposit ledger file 4a of the storage device 4, reads out the account information including the bank balance information of the customer and transmits this information to the automatic teller machine 1.

When the automatic teller machine 1 receives this account information, the screen shown in FIG. 13 is displayed on the customer operation panel 10 (Step S35). The customer confirms that the display is correct in step S35 and inputs the transaction amount (Step S36).

Consecutively, the digital cash balance in the customer money card 7 is checked by the main control unit 20 determine if it is enough for the entered deposit. For the check, the main control unit 20 subtracts the transaction amount from the digital cash balance in the customer money card 7 and then checks if the result is equal to or more than zero (Step S37). If the result is equal to or more than zero, the escrow card 16 stores the customer information 23 including the transaction amount information 23b shown in FIG. 6 (Step S38). Further if the result is less than zero in step S37, the transaction limit amount "$100.00" on the screen is blinked to notify the customer that the transaction amount exceeds the limit.

Next, the escrow card 16 displays the stored transaction amount information 23b on the customer operation panel 10. The customer confirms this display by pressing the 'Confirmation' key (Step S39). On the other hand, if there is an error in the transaction amount, the customer presses the 'cancellation/amendment' key. In the latter case, an amendment input screen is displayed on the customer operation panel 10, and the operation is returned to the step of the flow chart of FIG. 11 just prior to step S35.

The digital cash balance information 22b is read from the bank money card 14 (Step S40). The escrow card 16 stores this digital cash balance information 22b and the transaction day/time information 22a (Step S41). Next, the stored digital cash balance information in the escrow card 16 and the digital cash balance information in the bank money card 14 are compared. If the amounts are the same, the transaction amount is added to the digital cash balance of the bank money card 14, and the digital cash balance information of the bank money card 14 is renewed (Step S42). Further, the transaction amount is deducted from the digital cash balance of the customer money card 7, and the digital cash balance information of the customer money card 7 is renewed (Step S43).

Next, the transmission of fund information as renewed electronic data is confirmed. First, the transaction amount is deducted from the new digital cash balance inside the bank money card 14, and card 14 is checked to determine whether the result and the digital cash balance information 22b stored in the escrow card 16 are equal. Second, the transaction amount is added to the new digital cash balance in the customer money card 7, and the result is checked to determine whether the result and the digital cash customer balance information 23a in the escrow card 16 are equal (Step S44).

If the result of this check is disagreement, steps S42, S43 and S44 are repeated (Step S45). The transaction is interrupted in the case of disagreement, even if this operation is repeated several times (step S46). If the result of the check is agreement in step S44, the transaction information is transmitted to the host computer 3 and the deposit ledger file 4a of the customer is renewed (step S47).

The receipt handling unit 8 prints the customer's full name, account number, the transaction amount, new digital cash balance information and embossed character information on the receipt 9 and conveys the receipt to the opening 5h (Step S48).

The customer money card 7 is removed from its physical and electrical connection with the microchip card reader/writer 5e and is removed with the receipt 9 from the card insertion/return opening 5a (Step S49). When the customer extracts the money card 7 from the card insertion/return opening 5a, the detection device 5b detects the extraction (Step S50). In response to detection of the card extraction by the detection device 5b, the automatic teller machine 1 terminates the connection with the host computer 3 and completes the transaction (Step S51).

Transaction data is left on the escrow card 16 in this embodiment. Therefore, new transaction data is written over old transaction data in steps S38 and S41. However, the transaction data can be erased after the transaction has been completed.

As mentioned above, the balance information in the customer money card and the bank money card are renewed, after the escrow card 16 stores the transaction amount and the balance information in the both cards. Therefore, the contents of the transaction can be confirmed from the escrow card even if a malfunction occurs in the automatic teller machine 1 during movement of funds.

Figure 14:
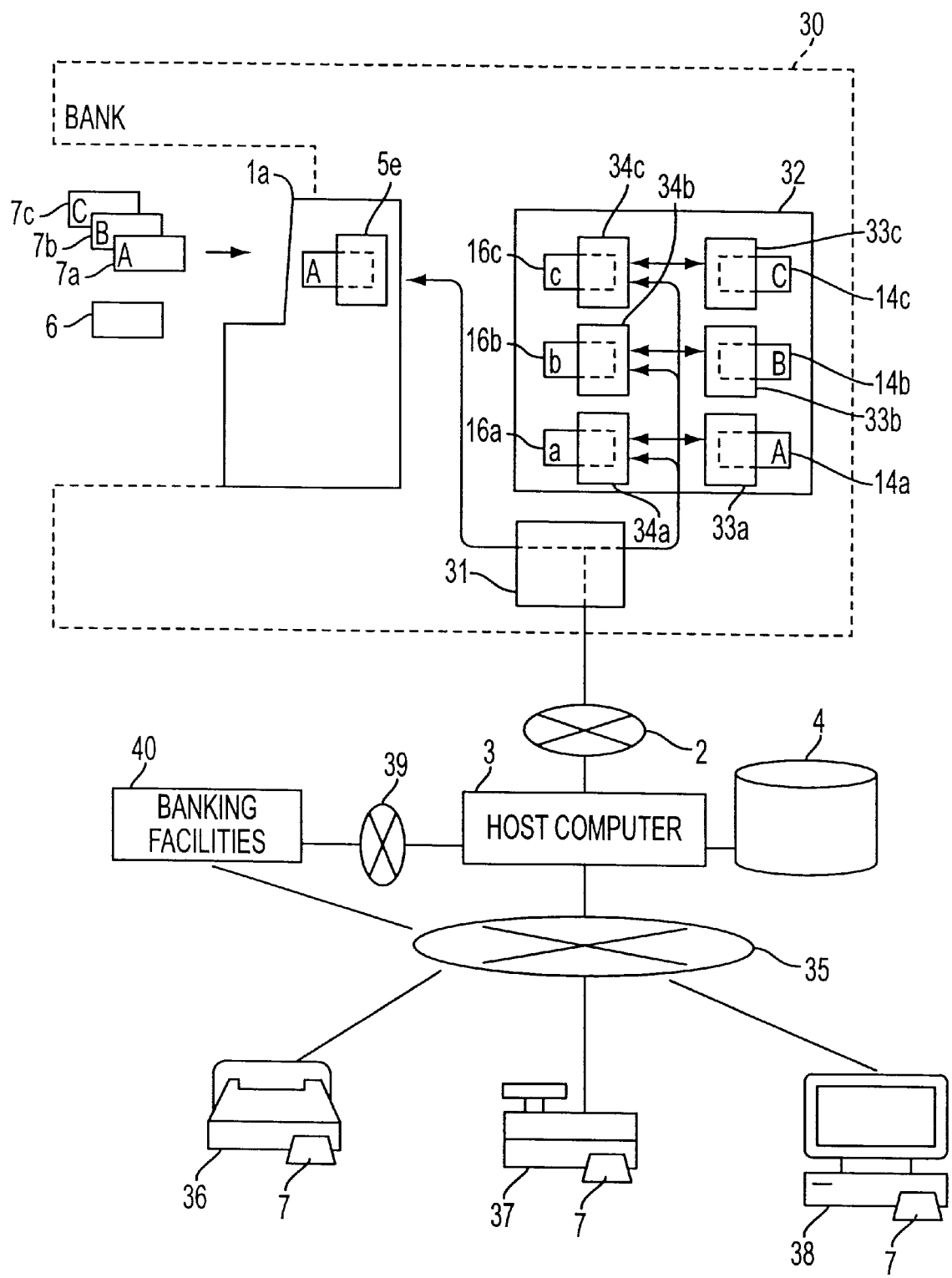
FIG. 14 is a block diagram of an automatic teller machine according to a second embodiment of the present invention.

Referring to FIG. 14, the second embodiment of the present invention is explained.

An automatic teller machine la associated with a bank is located at a bank 30. In this embodiment of the invention, the automatic teller machine la does not require the first card reader/writer 13 and the second card reader/writer 15 shown in FIG. 2. However, the other elements of the automatic teller machine la are the same as the automatic teller machine 1.

A server 31 controls the automatic teller machine la and transmits digital cash to bank money cards 14a, 14b, 14c. The bank money cards are of different types, for example, a type A (Card 14a), a type B (Card 14b) and a type C (Card 14c), each card being used for a different transaction mode because there are a plurality of transaction modes. A card array 32 is connected to the server 31 and is provided with microchip card reader/writers 33a, 33b, 33c and microchip card reader/writers 34a, 34b, 34c. The microchip card reader/writers 33a, 33b, 33c have the bank money cards 14a, 14b, 14c prepared for every transaction mode and write and read information stored in these bank money cards. The microchip card reader/writers 34a, 34b, 34c have escrow cards 16a, 16b, 16c corresponding to the bank money cards 14a, 14b, 14c, and write and read information is stored in these escrow cards 16a, 16b, 16c. Further, the number of bank money cards and escrow cards is not restricted to three, this number being in this embodiment only as an example.

A communication line 35 is a public or leased line and connects a home peripheral equipment 36, a point-of-sale terminal 37 and a personal computer 38 to the host computer 3. The home peripheral equipment 36 is composed of a multi-function telephone and a microchip card reader/writer and is used in order to trade between the customer money card 7 and a bank money card 14a, 14b, 14c. The point-of-sale terminal 37 is provided at retail stores and connects the customer money card 7 to the bank money cards 14a, 14b, 14c in order to trade between the cards. The personal computer 38 trades between the customer money card 7 and the bank money cards 14a, 14b, 14c. A finance network 39 connects the host computer 3 of the cooperating banking facilities. The network 39 enables mutual on line transactions with other banking facilities 40.

Figure 15:
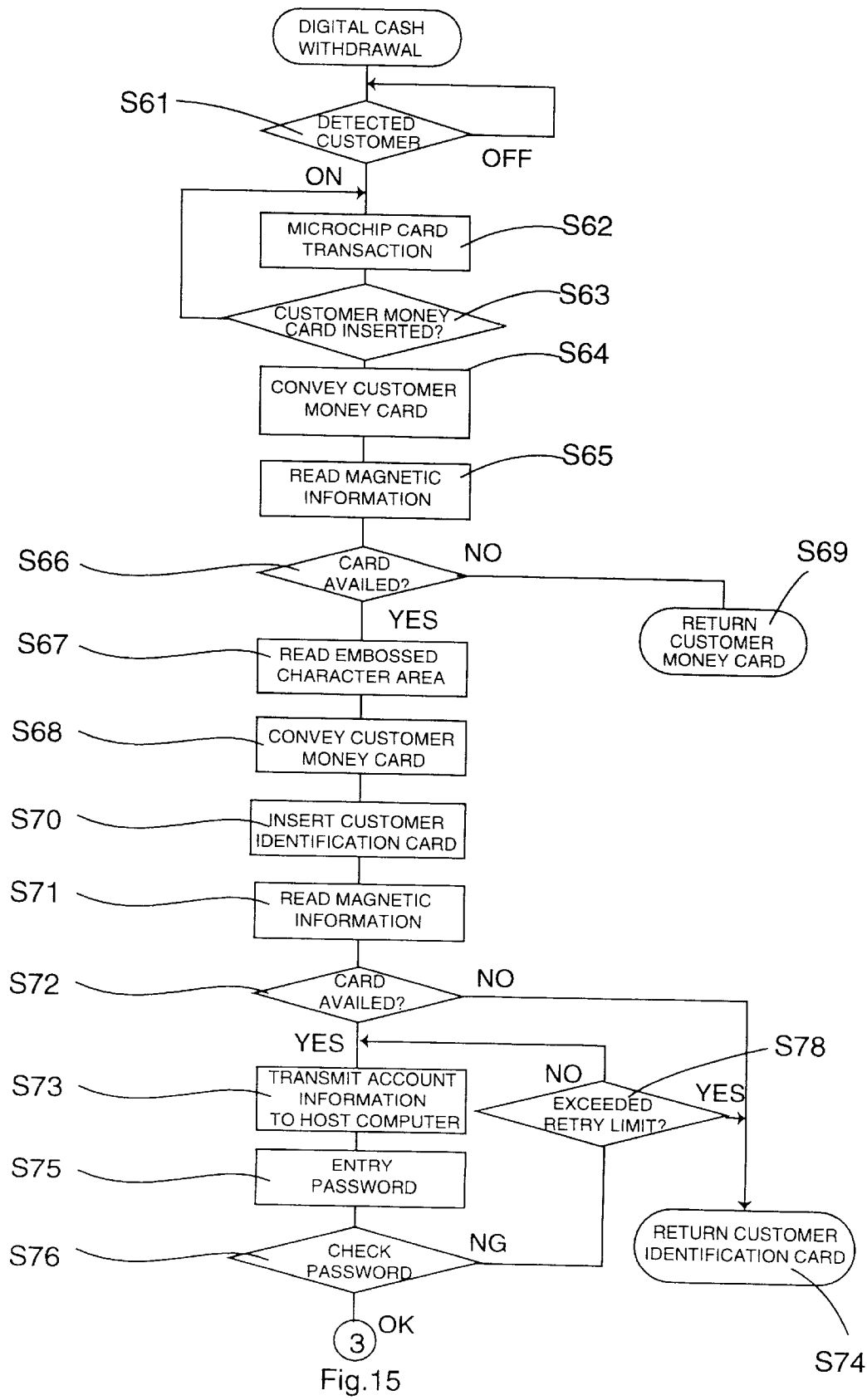
FIGS. 15, 16 and 17 are flow charts showing still other electronic transactions carried out with the present invention.
Figure 16:
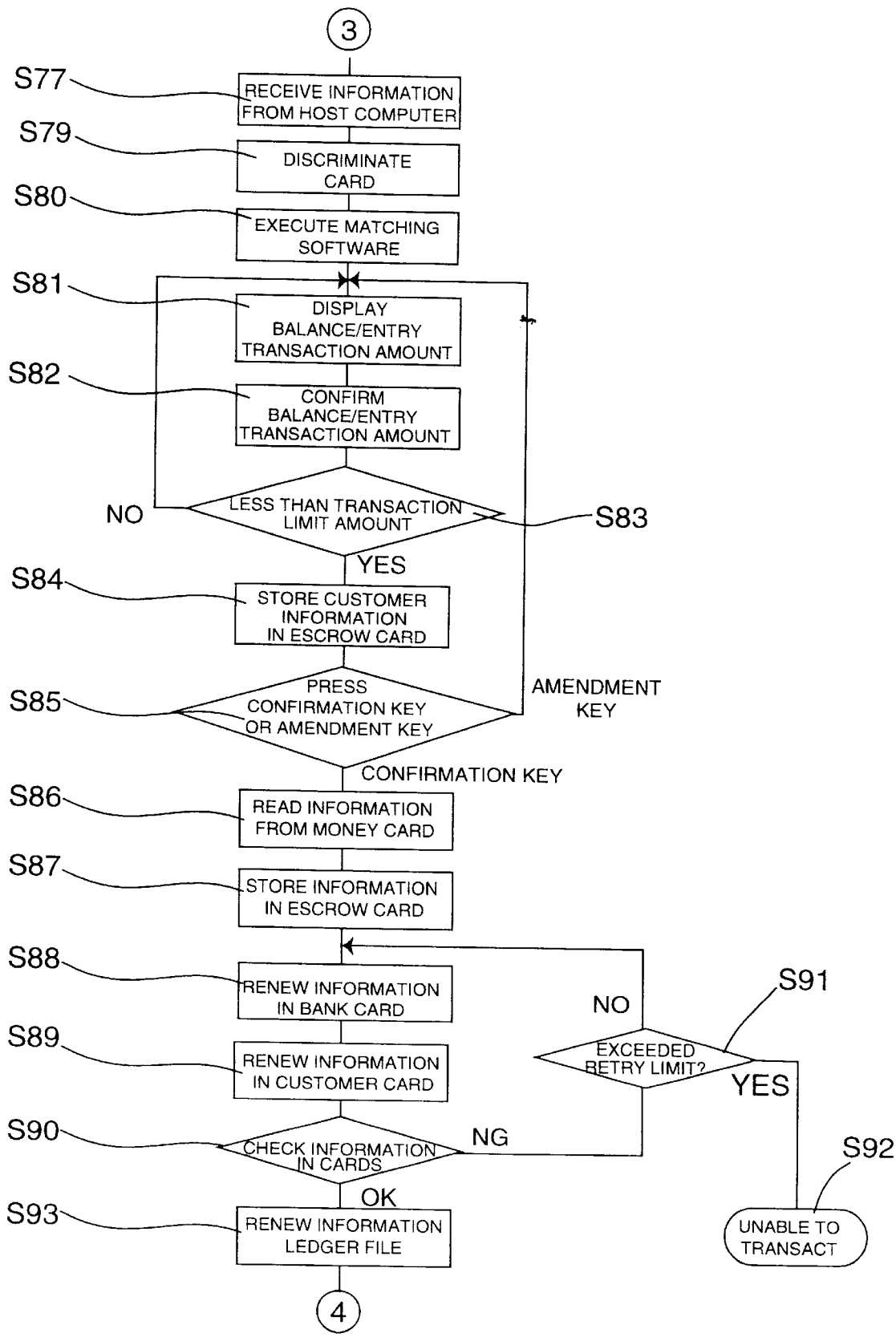
Figure 17:
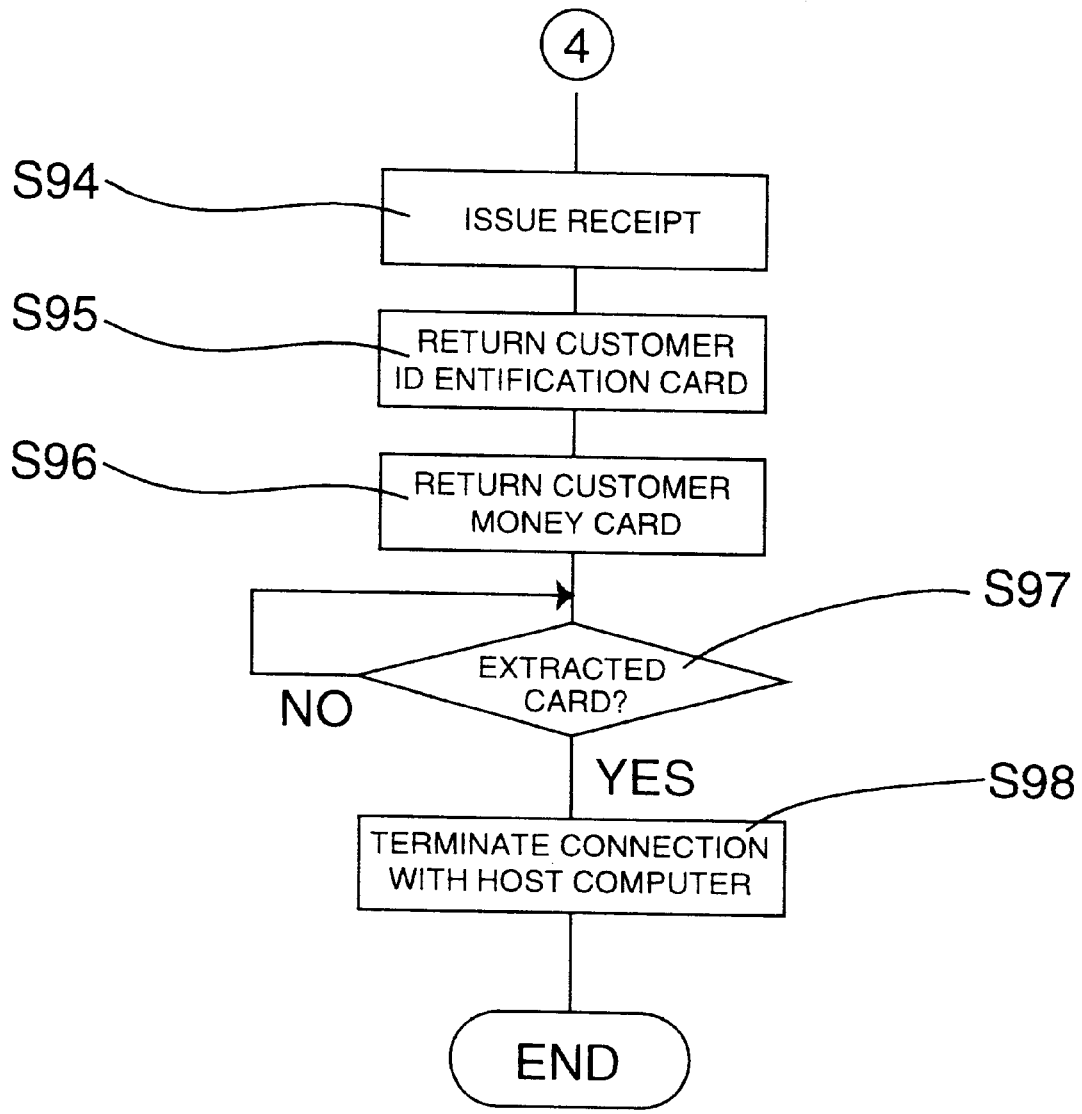

Referring to the flow charts of FIGS. 15, 16 and 17, the steps of a transaction in which a customer's microchip card and a customer's ID card are used to withdraw some digital cash from the bank are explained.

When a customer approaches the automatic teller machine 1a, the approach detection device 19 detects the presence of the customer (Step S61). In response, the automatic teller machine 1a changes the display of a touch screen on the customer operation panel 10 from a waiting screen to a screen which requests the customer to input information describing the transaction the customer desires to perform. When the customer inputs 'electronic transaction' on the touch screen, the screen changes to the screen shown in FIG. 9 (step S62 of FIG. 15) showing that a microchip card transaction has been selected. The message 'insert your card' is displayed on the screen in a flickering mode, and the customer inputs "withdrawal" on the touch screen and inserts the money card 7 in the card insertion/return opening 5a (Step S63) following which the magnetic information reader 5c reads the magnetic information stored in the magnetic stripe 161 on the customer money card 7(Steps S64, S65).

If it is determined that the card 7 is valid based on the magnetic information stored on stripe 161 (Step S66), the embossed character reader 5d reads the embossed character area 162 on the customer money card 7, and the information stored on stripe 161 and in area 162 is stored in memory 17 (Step S67). Next, the card handling unit 5 conveys the customer money card 7 to the microchip card reader/writer 5e (Step S68). Further, if it is determined that the card 7 is invalid based on the magnetic information stored on stripe 161 (Step S66), the card 7 is returned to the card insertion/return opening 5a (Step S69).

The customer operation panel 10 then displays the message "Insert your identification card" on the screen. The customer inserts the customer identification card 6 in the card insertion/return opening 5a. When the customer identification card 6 is inserted in the card insertion/return opening 5a, the detection device 5b detects it. By this detection, the customer identification card 6 is conveyed to the magnetic information reader 5c ( Step S70 ). The magnetic information reader 5c reads the magnetic information stored in the magnetic stripe 61 (Step S71).

If it is determined that the customer identification card 6 is invalid based on the magnetic information stored on stripe 61 (Step S72), the identification card 6 is returned to the card insertion/return opening 5a (See arrow R of FIG. 3). At this time, the customer operation panel 10 displays the message "Transaction can not be completed", and the extraction of card 6 is indicated to the customer (Step S74).

If it is determined that the customer identification card 6 is valid based on the magnetic information stored on stripe 61 (Step S72), the account information like the account number is transmitted to the host computer 3 which retrieves the customer's information from the deposit ledger file 4a inside the storage device 4 (Step S73). The customer information is retrieved through the finance network 39, if the account information belongs to another banking facility 40.

To make certain the person inserting the customer money card is the actual owner thereof, the statement "Input your password" is displayed on the customer operation panel 10 of the automatic teller machine 1a. The customer then inputs the password assigned to him by the bank (Step S75) and the password is checked (Step S76) to confirm that the holder of the card is entitled to use it. If confirmation is obtained, the host computer 3 accesses the deposit ledger file 4a of the storage device 4, reads out the bank balance information of the customer and transmit this information to the automatic teller machine 1a (Step S77).

If the customer inputs an incorrect password in step S76, the message "Invalid Password. Please Input Your Password Again" appears on the customer operation panel 10. If the password input by the customer does not agree even if this operation is repeated several times, the message "Invalid Password. Transaction Can Not Be Completed" appears on the customer operation panel 10 (Step S78). The card handling unit 5 then discharges the customer identification card 6 from the card insertion/return opening 5a (Step S74). The customer operation panel 10 displays the message "Confirm and Insert your card" or "Transaction can not be completed". The processing is executed from step S70, when the customer identification card 6 is inserted by the customer once again in accordance with this display. If the customer requests cancellation of the transaction, the customer money card 7 held in the microchip card reader/writer 5e is returned to the customer.

If it is determined that the customer identification card 6 can be used to complete the transaction, the embossed character reader 5d reads the embossed character area 62 on the customer identification card 6, and the information is stored in the memory 17. Next, the card handling unit 5 conveys the customer identification card 6 to the card waiting place 5f.

The automatic teller machine 1a discriminates the type of customer money card 7 in accordance with the magnetic information in the customer identification card 6 (Step S79). If the customer money card 7 is determined to be a type A card 7a, the main control unit 20 transmits type A control software to the microchip card reader/writer 5e and enables the transaction with the customer money card 7a and the escrow card 16a, and indicates read out of the storage contents in the customer money card 7a to the card handling unit 5 (Step S80).

The screen shown in FIG. 10 is displayed on the customer operation panel 10 and the customer inputs the transaction amount (Step S81). The main control unit 20 determines whether the transaction is possible by comparing the transaction amount with the bank balance information of the customer in step S77. If it is possible, the main control unit 20 then adds the transaction amount to the digital cash balance in the customer money card 7a, and the main control unit 20 determines whether the result of this addition is less than the accumulation limit amount (Step S83). If the sum of the transaction amount and the digital cash balance is less than the accumulation limit amount, the escrow card 16a stores the customer information 23 including the transaction amount information 23b shown in FIG. 6 (Step S84).

When the sum of the transaction amount and the digital cash balance is larger than the accumulation limit amount in step S83, the transaction limit amount on the screen is blinked to notify the customer that the requested transaction exceeds the limit.

After storing the customer information 23 (FIG. 6) in the escrow card 16 in step S12, the stored transaction amount information 23b is read out from the escrow card 16 and is displayed on the customer operation panel 10. The customer confirms this display by pressing the 'Confirmation' key (Step S85). On the other hand, if there is an error in the transaction amount, the customer presses the 'cancellation/amendment' key. In the latter case, an amendment input screen is displayed on the customer operation panel 10, and the operation is returned to the step of the flow chart of FIG. 16 just prior to step S81.

The digital cash balance information 22b is read from the bank money card 14a (Step S86). The escrow card 16a stores this digital cash balance information 22b and the transaction day/time information 22a (Step S87). Next, the stored digital cash balance information in the escrow card 16a and the digital cash balance information in the bank money card 14a are compared. If the amounts are the same, the transaction amount is deducted from the digital cash balance of the bank money card 14a and the digital cash balance information of the bank money card 14a is renewed (Step S88). Further, the transaction amount is added to the digital cash balance of the customer money card 7a, and the digital cash balance information of the customer money card 7a is renewed (Step S89).

Next, the transmission of fund information as renewed electronic data is confirmed. First, the transaction amount is added to the new digital cash balance inside the bank money card 14a and card 14a, is checked to determine whether the result and the digital cash balance information 22b stored in the escrow card 16a are equal. Second, the transaction amount is deducted from the new digital cash balance in the customer money card 7a, and the result is checked to determine whether the result and the digital cash customer balance information 23a in the escrow card 16a are equal (Step S90).

If the result of this check is disagreement, steps S88, S89 and S90 are repeated (Step S91). The transaction is interrupted in the case of disagreement, even if this operation is repeated several times (Step S92). If the result of the check is agreement in step S90, the transaction information is transmitted to the host computer 3 and the deposit ledger file 4a of the customer is renewed (Step S93). The receipt handling unit 8 prints the customer's full name, account number, the transaction amount, new digital cash balance information and embossed character information on the receipt 9 and conveys the receipt to the opening 5h (Step S94).

The customer identification card 6 is discharged from the card insertion/return opening 5a (Step S95). When the customer extracts the customer identification card 6 from the card insertion/return opening 5a, the detection device 5b detects the extraction. In response to detection of the card extraction by the detection device 5b, the customer money card 7a is removed from its physical and electrical connection with the microchip card reader/writer 5e and is removed with the receipt 9 from the card insertion/return opening 5a (Step S96). When the customer extracts the money card 7 from the card insertion/return opening 5a, the detection device 5b detects the extraction (Step S97). In response to detection of the card extraction by the detection device 5b, the automatic teller machine 1a terminates the connection with the host computer 3 and completes the transaction (Step S98).

As mentioned above, because the transaction mode of the customer money card is discriminated by the automatic teller machine, the automatic teller machine is able to handle a plurality of customer money cards wherein the transaction modes differ.

Figure 18:
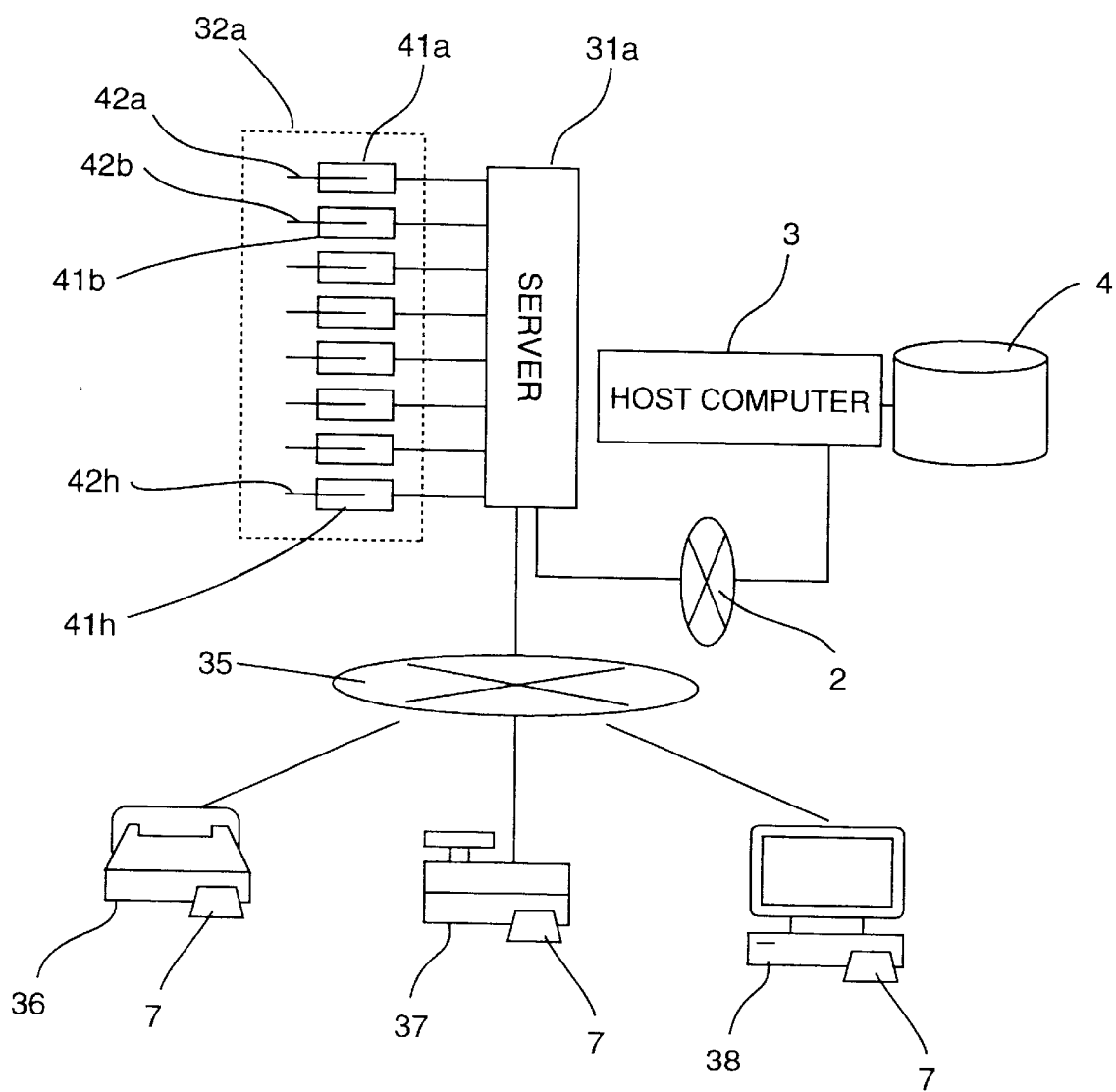
FIG. 18 is a block diagram of an automatic teller machine according to a third embodiment of the present invention.

Referring to FIG. 18, a third embodiment of the present invention is explained. FIG. 18 shows an electronic transaction system with which it is possible to make a deposit of digital cash in a money control center by utilizing a public line or a leased line.

A server 31a is provided at a bank. The server 31a controls microchip card reader/writers 41a, 41b, . . . , 41h and reads and also writes the information in escrow cards 42a, 42b, . . . , 42h.

The communication line 35 is a public line or a leased line and connects the home peripheral equipment 36, the point-of-sale terminal 37 and the personal computer 38 to the server 31a.

The data stored within the escrow cards 42a, 42b, . . . , 42h will now be described with reference to FIG. 19, which divides the data into two parts—a discrimination information part 43 and a customer information part divided into sections 44a and 44b. The discrimination information 43 consists of a card number, an operation apparatus number, a password and transaction day/time information. The card number is a number peculiar to the escrow card, and the operation apparatus number is the control number of the microchip card reader/writer in which the escrow card 16 is installed. The password is the number which must be inputted to read out transaction information on the occasion of an apparatus fault.

The customer information 44a consists of an operation number, an account number, the customer's full name, transaction day/time information and the transaction amount information read from the customer money card 7. The customer transaction information 44b is the same data format as the customer transaction information 44a. A record area of such customer transaction information is provided to a plurality of EEPROMs 167 (FIG. 5(b)) and the information is stored for every transaction.

Next, an electronic transaction using the point-of-sale terminal 37 is explained.

A retail storekeeper inserts the customer money card 7 in the point-of-sale terminal 37. The point-of-sale terminal 37 is connected to the server 31a through the communication line 35 and requests the retail storekeeper to input information describing the transaction the retail storekeeper desires to perform. The server 31a transmits the data for a mutual check to the point-of-sale terminal 37.

If the customer money card 7 is inserted in the point-of-sale terminal 37, the point-of-sale terminal 37 reads the information stored in the customer money card 7. First, the point-of-sale terminal 37 gives a voltage/clock signal with a specified sequence to the terminal 164 on the integrated circuit 163 (FIG. 5(b)) and certifies mutuality by a specified communication protocol. And, if certification is carried out mutually, the point-of-sale terminal 37 reads the stored information and transmits the information to the server 31a.

The server 31a checks the information and confirms whether the transaction is possible. If the transaction is possible, the retail storekeeper is induced to input a password. The customer then inputs the password assigned to him by the bank, and the password is checked to confirm that the holder of the card is entitled to use it.

If the retail storekeeper selects "deposit", the server 31a demands the input of a transaction amount by the retail storekeeper through the point-of-sale terminal 37. The retail storekeeper inputs the transaction amount in the point-of-sale terminal 37. If this transaction amount is less than the digital cash balance amount stored in the customer money card 7, the customer money card 7 transmits the transaction amount information to the server 31a through the point-of-sale terminal 37. The server 31a stores this transaction amount information 44a in the escrow card 42a.

Next, the server 31a reads out the customer transaction information 44a stored in the escrow card 42a and transmits the operation number, transaction day/time and transaction amount to the point-of-sale terminal 37. The point-of-sale terminal 37 displays the transaction amount on the customer operation panel (not shown) and demands confirmation of the transaction amount by the retail storekeeper.

When the retail storekeeper confirms the transaction amount, the server 31a terminates the storage of transaction information to the escrow card 42a. The point-of-sale terminal 37 stores the operation number, transaction day/time and transaction amount information in the customer money card 7 and completes the transaction.

Further, final settlement is the point when the balance information in the deposit ledger file 4a corresponding to the account of a customer is renewed on the basis of the customer transaction information 44a in the escrow card 42a. This settlement is valid whether in real time or processed later.

Although eight escrow cards are shown in FIG. 18, the invention is not restricted to this number.

A plurality of escrow cards can be assigned to each customer money card or each point-of-sale terminal or a sequence of transactions. In the case of a sequence of transactions, if the escrow card 42*a* is used for a transaction, for example, another transaction is executed by the escrow card 42*b*.

As many apparently widely different embodiments of this invention may be made without departing from the spirit and scope thereof, it is to be understood that the invention is not limited to the specific embodiments thereof except as defined in the appended claims.

What is claimed is:

1. An electronic transaction processing system for performing a transaction comprising at least one of a deposit and a withdrawal of digital cash between a customer and a banking facility, the electronic transaction processing system comprising:

a host computer having a memory;

a customer's memory apparatus storing digital cash of the customer;

a banking facility's memory apparatus storing digital cash of the banking facility;

an escrow memory apparatus that stores balance information of digital cash stored in each of said customer's memory apparatus and said banking facility's memory apparatus prior to renewal of said digital cash stored in each of said customer's memory apparatus and said banking facility's memory apparatus, said customer's, banking facility's and escrow memory apparatuses being distinct from the memory of the host computer and not directly connected to said host computer; and wherein a transaction is processed by renewing digital cash stored in said customer's memory apparatus and in said banking facility's memory apparatus in response to a transaction amount, based on said balance information of digital cash stored in said escrow memory apparatus.

2. A system according to claim 1, further comprising an automatic teller machine housing said banking facility's memory apparatus and said customer's memory apparatus, said automatic teller machine discharging and taking in said customer's memory apparatus.

3. A system according to claim 2, wherein said automatic teller machine provides a screen that displays at least the balance information of digital cash stored in the customer's memory apparatus and a balance information in a customer's account.

4. A system according to claim 2, wherein said automatic teller machine provides a screen for displaying a transaction limit amount.

5. A system according to claim 4, wherein said transaction limit amount in a withdrawal processing is computed by subtracting the balance of digital cash stored in the customer's memory apparatus from an accumulation limit amount in the transaction.

6. A system according to claim 4, wherein said transaction limit amount on said screen is blinked when the customer requests a transaction amount that exceeds the transaction limit amount.

7. A system according to claim 1, wherein a plurality of said escrow memory apparatuses are provided, said plurality of escrow memory apparatuses being selected in response to characteristics of said first memory apparatus.

8. A system according to claim 7, further comprising a card array that houses said plurality of escrow memory apparatuses.

9. A system according to claim 1, wherein digital cash, after the renewal of said digital cash stored in said escrow memory apparatus and said digital cash stored in said banking facility's memory apparatus, is confirmed by using said balance information of digital cash stored in said escrow memory apparatus and the transaction amount, which is also stored in said escrow memory apparatus.

10. A system according to claim 1, wherein said third memory apparatus provides a plurality of areas for storing data, said plurality of areas being divided at least into a discrimination information part storing information of the banking facility and a customer information part storing information of the customer.

11. A system according to claim 10, wherein said customer information part includes the balance information of digital cash stored in said customer's memory apparatus, and said discrimination information includes the balance information of digital cash stored in said banking facility's memory apparatus.

12. A system according to claim 1, wherein said customer's memory apparatus transmits the balance information of digital cash to the escrow memory apparatus through a communication line.

13. A system according to claim 1, wherein said customer's memory apparatus, said banking facility's memory apparatus and said escrow memory apparatus are collocated.

14. A method of performing a transaction comprising at least one of a deposit and a withdrawal of digital cash between a customer and a banking facility, the method comprising the steps of:

a) storing customer information, including account balance information, in a memory associated with a host computer;

b) storing balance information of digital cash stored in a customer's memory apparatus into a an escrow memory apparatus, the customer's memory apparatus and the escrow memory apparatus being distinct from said memory associated with said host computer and not directly connected to said host computer;

c) storing balance information of digital cash stored in a banking facility's memory apparatus into said escrow memory apparatus, said banking facility's memory apparatus being distinct from said memory associated with said host computer and not directly connected to said host computer;

d) renewing digital cash stored in said customer's memory apparatus and in said banking facility's memory apparatus in response to a transaction amount based on each said balance information of digital cash stored into said escrow memory apparatus.

15. A method according to claim 14, further comprising the steps of:

d) confirming the amounts of digital cash renewed in said customer's memory apparatus and said banking facility's memory apparatus based on said transaction amount and each said balance information of digital cash stored into said escrow memory apparatus;

e) if the amounts of digital cashed renewed are successfully confirmed, continuing the processing of said deposit and/or withdrawal; and f) if the confirming step fails, re-executing the renewing step.

16. A method according to claim 15, further comprising the steps of:

g) re-executing steps d-f multiple times;

h) performing step d; and i) if step h fails, interrupting said deposit and/or withdrawal.

17. A method according to claim 14, wherein said customer's memory apparatus, said banking facility's memory apparatus and said escrow memory apparatus are collocated.

* * * * *